(No Model.)

W. D. BROOKS.
CAN CAP.

No. 437,086.          Patented Sept. 23, 1890.

Attest
Walter Donaldson
F. L. Middleton

Inventor
William D. Brooks
by Ellis Spear
Atty.

UNITED STATES PATENT OFFICE.

WILLIAM D. BROOKS, OF BALTIMORE, MARYLAND, ASSIGNOR TO MARY E. BROOKS, OF SAME PLACE.

CAN-CAP.

SPECIFICATION forming part of Letters Patent No. 437,086, dated September 23, 1890.

Application filed June 7, 1890. Serial No. 354,576. (No model.)

*To all whom it may concern:*

Be it known that I, WILLIAM D. BROOKS, a citizen of the United States of America, residing at Baltimore, in the State of Maryland, have invented certain new and useful Improvements in Can-Caps, of which the following is a specification.

Heretofore the edges of metal sheets used in forming tin cans have been provided with a film of solder by dipping into a bath of molten solder, and in Letters Patent No. 364,662 a cap for sheet-metal cans is shown and described, having its edge provided with a strip of solder folded over the edge, the solder being applied in the form of a thin ribbon. It is desirable to provide can-caps with a larger amount of solder than that which would adhere to the edge of the sheet metal when dipped in the molten solder, and hence the first method of applying solder could not be utilized in connection with the caps of cans. The second method referred to is objectionable, for the reason that the thin ribbon of solder is held in place on the edge of the can by compression only, and thus it is liable to be knocked off or displaced as it comes in contact with the soldering-iron.

It is the object of my invention to provide a can-cap with a sufficient amount of solder for the purpose desired and to arrange it upon the upper edge of the cap so that it will be evenly distributed and be free from all danger of being displaced by contact with the soldering-iron.

My invention consists of a can-cap having a bead of solder formed on the margin of its upper face within the line of the periphery of the cap.

Figure 1:
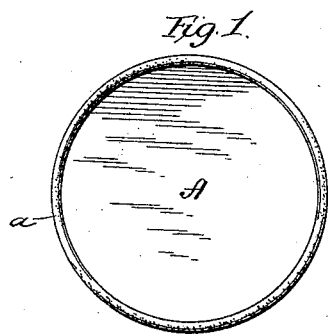
Figure 2:
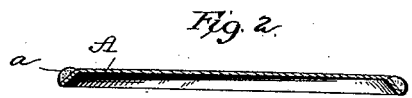

In the accompanying drawings, Figure 1 is a plan view of the cap, and Fig. 2 a section of the same.

I do not desire to limit myself to any particular means or method of applying or forming the bead on the upper margin of the cap, as this may be done in a variety of ways and by the use of mechanism differing materially in respect to each other; but for an illustration of a method and apparatus for carrying out the invention I refer to an application filed by me March 5, 1890, Serial No. 342,755.

In the application referred to I have described the molding of the bead of solder upon the margin of the can by forming a channel and directing the molten solder into this channel or mold, whereby the bead is molded on the surface of the cap, and this gives it solidity and prevents displacement, as it is practically soldered to the said surface. While this is the best way known to me of applying the bead, it may be applied in other ways— namely, by being first formed in ring shape and then caused to adhere to the surface by compression, or by being melted within a mold or channel, first being applied in ring shape to the cap-surface. It will thus be seen that the cap A is provided with a bead of solder $a$ on the margin of the upper surface only, that it is so held to the cap as to prevent displacement and consequent waste, and that when the cap is in place on the can-head and heat applied thereto the solder runs down into the groove and is sweated into the same.

Having thus described my invention, what I claim is—

1. A can-cap having a bead of solder on the margin of its upper face, substantially as described.

2. A can-cap having a molded bead of solder on the margin of its upper face.

In testimony whereof I affix my signature in presence of two witnesses.

WILLIAM D. BROOKS.

Witnesses:
HENRY E. COOPER,
T. J. JOHNSTON.